United States Patent

[11] 3,614,643

[72] Inventor Andrew J. Slobodnik, Jr.
Lowell, Mass.

[21] Appl. No. 24,691
[22] Filed Apr. 1, 1970
[45] Patented Oct. 19, 1971
[73] Assignee The United States of America as represented by the Secretary of the Air Force

[54] MICROWAVE ACOUSTIC SURFACE WAVE AMPLIFIER AND METHOD OF FABRICATION
4 Claims, 9 Drawing Figs.

[52] U.S. Cl. ........................................ 330/5.5, 307/88.3, 321/69 R, 330/10, 333/30 R
[51] Int. Cl. ........................................ H03f 13/00
[50] Field of Search ........................................ 330/5.5

[56] References Cited

OTHER REFERENCES

Lean et al., " Applied Physics Letters," Jan. 1, 1970, pp. 32-35, 307-88.3

*Primary Examiner*—Roy Lake
*Assistant Examiner*—Darwin R. Hostetter
*Attorneys*—Harry A. Herbert, Jr. and Willard R. Matthews, Jr.

ABSTRACT: Nonlinear acoustic properties of crystalline media are utilized to achieve amplification in an acoustic surface wave device. Power density curves of acoustic surface waves traveling along a piezoelectric substrate member have been found to exhibit negative slopes. Amplification is accomplished by modulating the acoustic surface wave at a point on the substrate member corresponding to the first zero slope and demodulating it at the second zero slope.

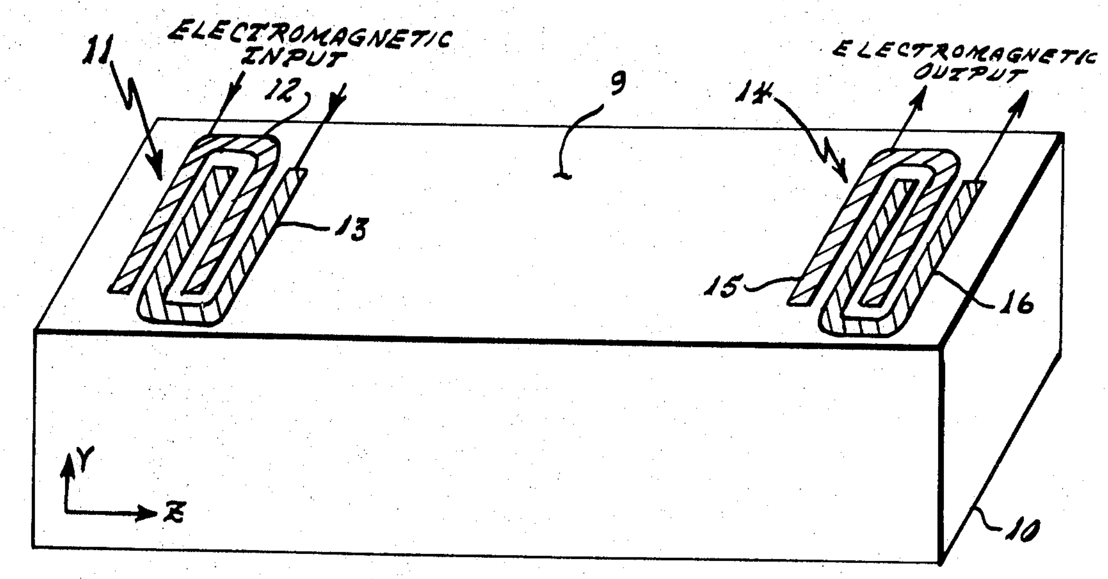
FIG. 1 PRIOR ART
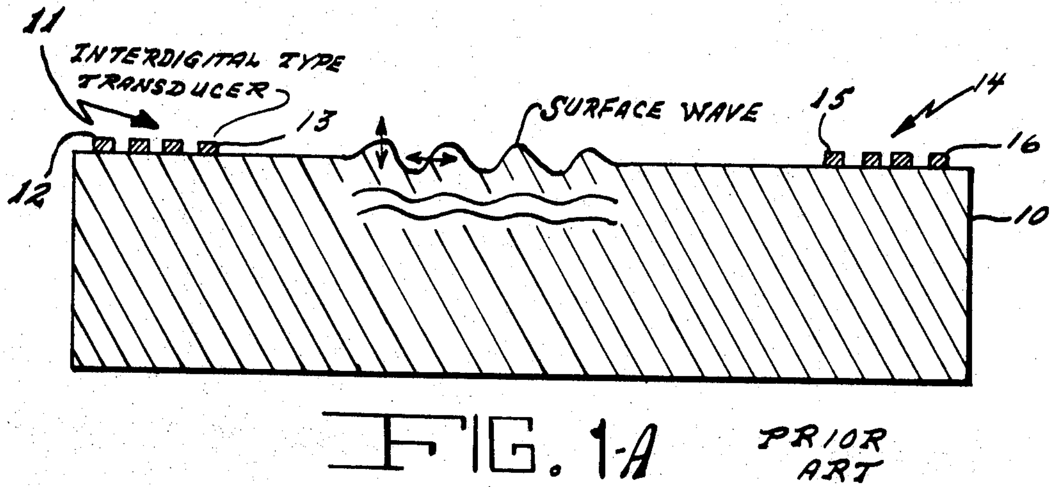
FIG. 1-A PRIOR ART
INVENTOR.
ANDREW J. SLOBODNIK JR
BY Harry A. Herbert Jr and Willard R. Matthews
ATTORNEYS INVENTOR.
ANDREW J. SLOBODNIK Jr.
BY Harry A. Herbert Jr and Willard R. Matthews Jr
ATTORNEYS INVENTOR
ANDREW J. SLOBODNIK Jr.
BY
ATTORNEYS INVENTOR.
ANDREW J SLOBODNIK JR
BY Harry A. Herbert Jr. and Willard R. Matthews Jr.
ATTORNEYS

MICROWAVE ACOUSTIC SURFACE WAVE AMPLIFIER AND METHOD OF FABRICATION

BACKGROUND OF THE INVENTION

This invention relates to microwave acoustic surface wave devices, and particularly to amplifiers and other devices that utilize the nonlinear acoustic properties of crystalline substrate members.

Volume or bulk wave acoustic devices such as acoustic delay lines, phase shifters and directional couplers have been used in microwave systems for some time. Recently, in an attempt to reduce power requirements, considerable effort has been expended to perfect various acoustic surface wave devices.

Microwave-frequency surface wave devices have several advantages over their volume-wave counterparts. Surface waves require two surfaces which must be parallel to optical tolerances. The fabrication techniques for surface wave transducers are the same as those used for integrated circuits, so that a surface wave delay line could, for example, be fabricated on a substrate together with a transistor amplifier. The amplification of surface waves by means of their traveling wave interaction with drifting carriers in semiconductors has several advantages over the corresponding amplification of volume waves. The surface wave is accessible along the entire surface, so that it is possible to make contiguously tapped delay lines for such signal processing functions as pulse expansion and compression. Magnetic surface waves on ferrimagnetic substrates have been found to be nonreciprocal and this makes them of potential use for such devices as isolators, circulators, and phase shifters. Acoustic surface waveguides and directional couplers have been fabricated for use at megahertz frequencies. The width of acoustic waveguide components at microwave frequencies would be of the order of micrometers. Thus, there exists the possibility of entire microwave acoustic-integrated circuits which could be as much as five orders of magnitude smaller than their electromagnetic equivalents.

The current state of the art of microwave acoustic surface wave devices is reviewed in detail in the publication, *The Generation and Propagation of Acoustic Surface Waves at Microwave Frequencies*, by Paul H. Carr, *IEEE Transactions on Microwave Theory and Techniques*, Vol. MTT–17, Nov., 1969.

Acoustic surface wave devices are inherently small, lightweight and rugged and are therefore particularly adapted to airborne and aerospace applications. With reference to airborne radar applications, the use of microwave frequencies is the only way to obtain the 0.5–1-GHz. bandwidths necessary to improve range resolution. In addition, the operation of signal processing devices at microwave frequencies eliminates the necessity for frequency down-conversion and subsequent up-conversion with its insertion loss, increased complexity, and loss of phase information. There is, therefore, a current need for efficient, small, rugged, lightweight microwave acoustic signal processing devices of all types. In particular, amplifiers, harmonic generators, limiters and mixers that have modest power requirements and that operate without external bias supplies are yet unavailable. The present invention is directed toward providing such system components and toward teaching novel methods and techniques that will lead to entire acoustic signal processing systems.

SUMMARY OF THE INVENTION

The present invention is a microwave amplifier comprising a piezoelectric substrate member having one polished surface suitable for the propagation of acoustic surface waves therealong, in combination with an electromagnetic wave to acoustic surface wave input transducer, a modulator and a demodulator, said transducer, modulator and demodulator being affixed to the acoustic wave propagating surface of the substrate member.

It has been discovered that an acoustic surface wave fundamental propagating along a piezoelectric substrate member from an electromagnetic wave excited input transducer will, after a period of decay, grow for a given distance and then continue to decay. In practicing the present invention acoustic wave fundamental power measurements are taken along the acoustic wave propagation surface to determine at which points minimum and maximum values occur. By modulating the fundamental at the first minimum and demodulating it at the next succeeding maximum amplification is achieved without the requirement of a pump frequency.

It is a principal object of the invention to provide a new and improved microwave acoustic surface wave amplifier.

It is another object of the invention to provide an acoustic surface wave amplifier that is rugged, lightweight and small.

It is another object of the invention to provide an acoustic surface wave amplifier of greater efficiency and larger bandwidth than currently available devices.

It is another object of the invention to provide an acoustic surface wave amplifier that does not require an external pump frequency and that has lower power requirements than currently available devices of its type.

These, together with other objects, advantages and features of the invention, will become more apparent from the following detailed description when taken in conjunction with the illustrative embodiments in the accompanying drawings.

DESCRIPTION OF THE DRAWINGS

FIG. 1 is an orthogonal view of a microwave frequency acoustic surface wave delay line;

FIG. 1A is a side view of the delay line of FIG. 1 schematically illustrating acoustic surface waves propagating therealong;

DETAILED DESCRIPTION OF THE PREFERRED EMBODIMENTS

Figure 2:
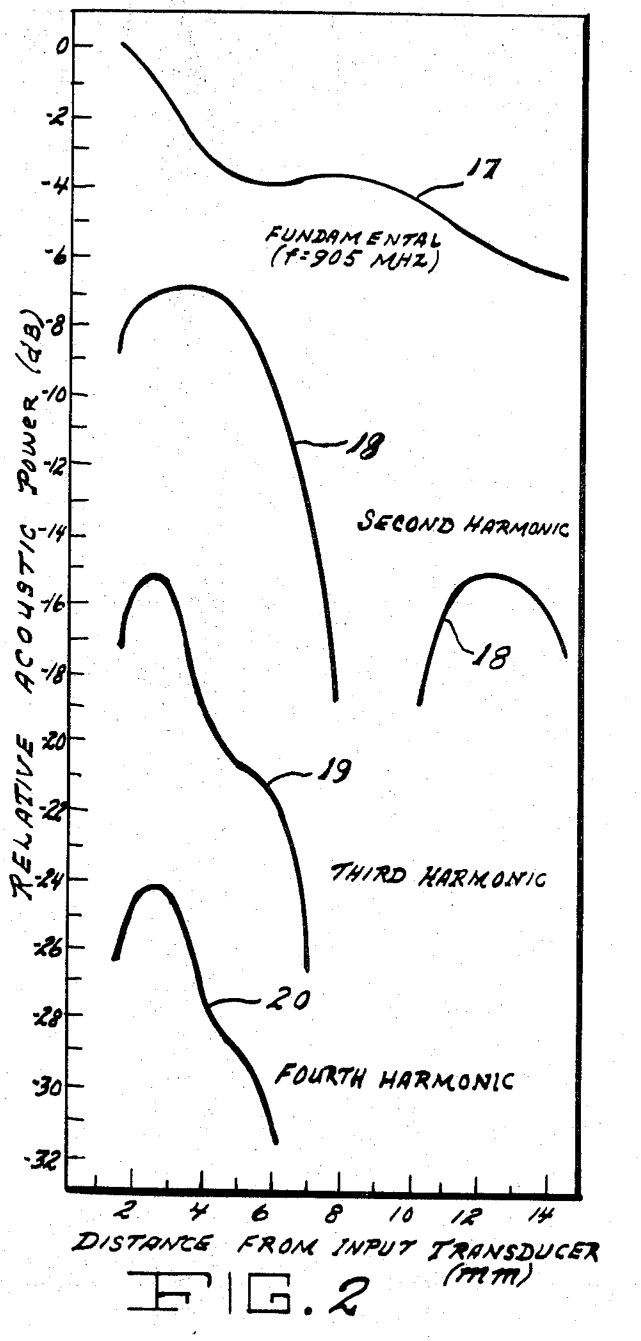
FIG. 2 is a graph illustrating the growth and decay of surface wave fundamental and harmonics as a function of distance from the input transducer.

Referring now to FIGS. 1 and 1A, there is illustrated thereby an acoustic surface wave device comprising substrate member 10, input transducer 11 and output transducer 14. Substrate member 10 can be any suitable crystalline media or piezoelectric material such as lithium niobate ($LiN_bO_3$) or barium sodium niobate ($Ba_2NaNb_5O_{15}$). Input transducer 11 consists of interdigital fingers 12 and 13 which may be affixed to the propagating surface 9 by printed or integrated circuit techniques. Output transducer 14 consisting of interdigital fingers 15 and 16 is similarly affixed to surface 9. The operation of such a device when used as a delay line is illustrated by FIG. 1A. The electromagnetic wave input produces an electric field between the half-wavelength spaced lines of the interdigital-type transducer on the piezoelectric substrate. The piezoelectric effect produces a stress which propagates along the surface in both directions, the two acoustic powers being equal by symmetry. The surface wave propagating toward the output transducer is detected by means of the piezoelectric effect. The wave propagating in the opposite direction can be terminated by an acoustic absorber such as wax or tape (not shown).

Certain nonlinear acoustic properties of crystalline media have been discovered through investigation and measurement of the acoustic surface wave power densities along the substrate propagating surface. FIg. 2 contains various curves that illustrate this nonlinear phenomena. Curves 18, 19 and 20 represent the power densities measured at various distances from the input transducer of the second, third and fourth harmonics respectively of a 905-MHz. input signal. Curve 17 represents the fundamental of the same input signal. An examination of the curves of FIG. 2 readily reveals substantial interaction between the harmonics and the fundamental of acoustic surface waves propagating along a crystalline substrate member. Of particular importance is the discrete point, unique to each, at which each harmonic exhibits a power peak. Also of particular importance is the negative slope that occurs in the fundamental curve 17. It is apparent that at the point of maximum interaction between harmonics and fundamental, and beyond for a given distance, the harmonics recontribute energy to the fundamental. The characteristic peaks of the several harmonics and the unique negative slope of the fundamental are phenomenon upon which the various novel devices of the present invention are based. Measurement of the power densities of acoustic surface waves can be accomplished in any conventional manner. Laser light deflection constitutes a particularly convenient tool for accomplishing these ends. Such a technique is well known in the prior art and has been used to detect and study the nonlinear effects of harmonic generation and mixing in surface wave delay lines. In practicing the technique a microwave electromagnetic wave is converted to an acoustic surface wave by means of the interdigital input transducer. This wave periodically modulates the substrate surface which, according to well-known electromagnetic scatter theory deflects any incident light into side lobes as well as into the specular direction. The intensity of the deflected light is directly related to the intensity of the surface wave and the angular directions are given by the grating equation:

$$\text{Sin } \theta_m = \text{Sin } \theta_o + m \lambda$$

Here λ is the wavelength of the incident light and *m* is the surface wavelength. The fundamental surface wave or any of its harmonics can then be monitored by placing a suitable light detector at an angle corresponding to the proper wavelength.

Figure 3:
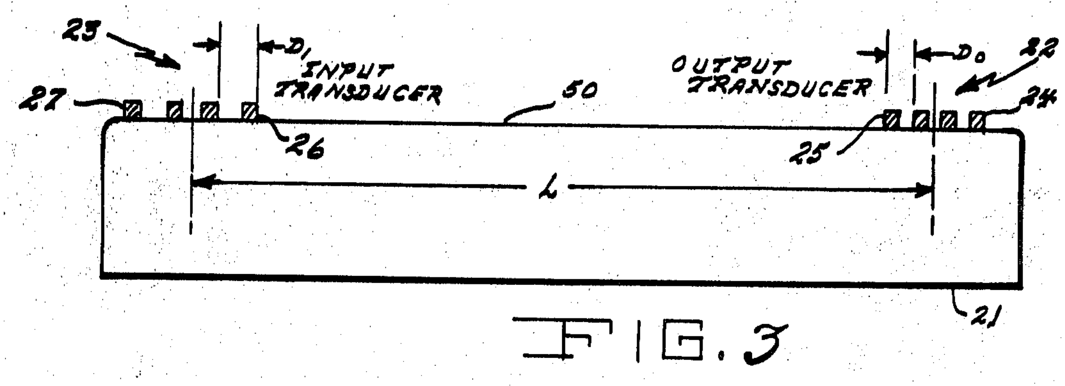
FIG. 3 illustrates a microwave acoustic surface wave harmonic generator.

Using these procedures, nonlinear effects can be investigated as a function of distance by scanning the laser along the direction of propagation of the surface wave as a function of input power. This measuring technique is described in detail in the periodical article, *Microwave Frequency Acoustic Surface Wave Propagation Losses in* $LiN_bO_3$, by A. J. Slobodnik, Jr., published in *Applied Physics Letters*, Volume 14, No. 3, page 94, 1 Feb. 1969. It comprises a substrate member 21 having a surface 50 polished to accommodate the propagation of acoustic surface waves. Substrate member 21 can be of lithium niobate or any other suitable crystalline media capable of supporting acoustic wave propagation. An electromagnetic wave to acoustic surface wave input transducer 23 is affixed to surface 50 by printed circuit or integrated circuit techniques. Input transducer 23 comprises interdigital fingers 26 and 27 that are spaced to accommodate the desired operating frequency of the device ($D_1=\Lambda/2$). Acoustic surface wave to electromagnetic wave output transducer 22 is also affixed to surface 50. This output transducer consists of interdigital fingers 24 and 25 which are spaced to accommodate the desired harmonic. FIG. 3 is a harmonic generator designed to operate at the second harmonic requiring that spacing of interdigital fingers be equal to quarter wavelengths ($D_o=\Lambda/4$). The distance between input and output transducer L is determined by the surface wave power peak of the desired harmonic. By way of example, the parameters of second, third and fourth harmonic generators fabricated in accordance with the curves 18, 19 and 20 of FIG. 2 for an operating frequency of 905 MHz. would be: Second harmonic generator $D_1=2D_o=1.93$ μm., $L=3.4$ mm. Third harmonic generator $D_1=3D_o=1.93$ μm., $L=2.6$mm. Fourth harmonic generator $D_1=4D_o=1.93$ μm., $L=2.5$mm.

Figure 4:
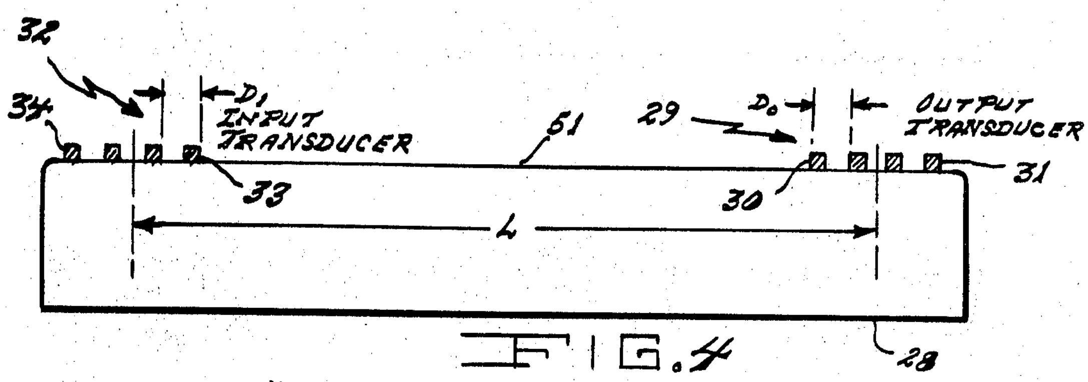
FIG. 4 illustrates a microwave acoustic surface wave limiter.
Figure 7:
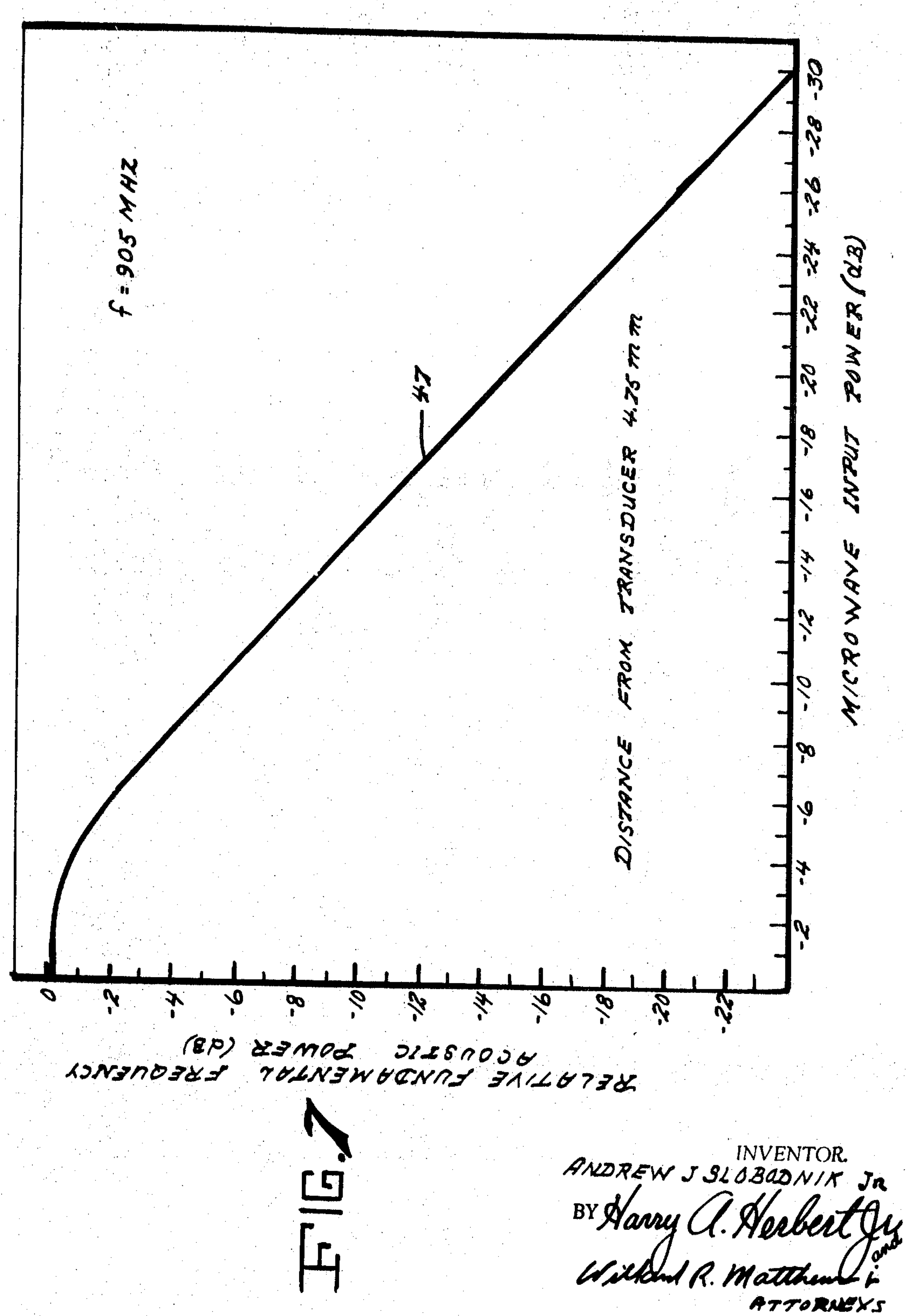
FIG. 7 is a graph of the power in the fundamental frequency acoustic surface wave as a function of microwave input power illustrating the limiting action of the limiter of FIG. 4.

A microwave acoustic surface wave limiter which utilizes the novel concepts of the present invention is schematically illustrated by FIG. 4. The limiter comprises a substrate member 28 of piezoelectric material, input transducer 32 and output transducer 29. Surface 51 of the substrate member is polished to accommodate the propagation of acoustic surface waves. Input transducer 32 consists of interdigital fingers 33 and 34 which are affixed to the surface 50 by printed circuit techniques. Output transducer 29 consists of interdigital fingers 30 and 31 which are likewise affixed to surface 51 as shown. The spacing between interdigital fingers ($D_1$and $D_o$) is set to tune the input and output transducer to the operating frequency of the limiter. In the present case, $D_1=D_o=\Lambda/2$. The distance L between input and output transducers is determined by the surface wave power density characteristics for the particular substrate member and operating frequency. Design and fabrication of the limiter comprehends applying an electromagnetic wave input signal to input transducer 32 and measuring the fundamental harmonic power densities of the resultant acoustic surface wave propagating along the surface 51. By way of example, the curves 17, 18, 19 and 20 of FIG. 2 illustrate such power densities for the fundamental and harmonics of a 905MHz.-input signal. The output transducer is positioned at the point of maximum interaction between the fundamental and the harmonics. This substantially coincides with the first zero slope of fundamental curve 17. A limiter designed from the above-referenced curves would therefore have a distance L between transducers of 4.75 mm. and transducer finger spacing $D_1=D_o$ of 1.93 μm. Referring now to FIG. 7, the curve 47 disclosed therein illustrates the limiting action of a limiter so constructed. The limiting action of the limiter is clearly evident from an examination of FIG. 7 since increases in input power above a certain level does not result in an increase in output power. Since this limiting action occurs at a given acoustic power density it is only necessary to vary the lengths of the interdigital transducer fingers in order to obtain limiting at any specific value of total electromagnetic input power level. The limits on this process therefor are only: excess power dissipation in the transdcuer fingers; and, excess diffraction losses. Within these limits this process can also be used to obtain efficient harmonic generation at any convenient value of input power.

Figure 8:
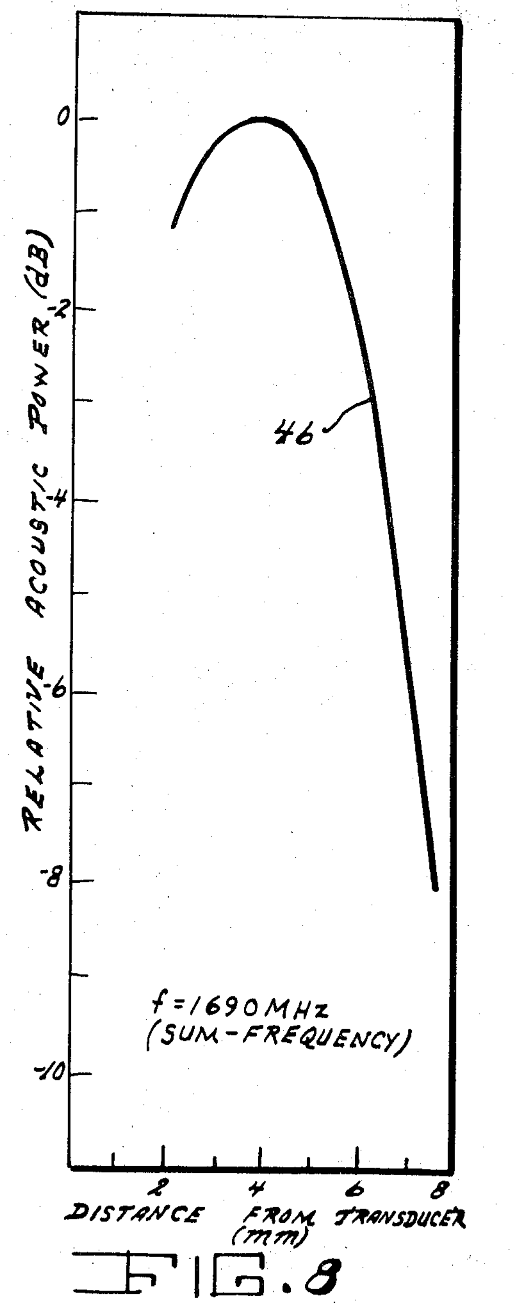
FIG. 8 is a graph showing the growth and decay of a sum frequency surface wave caused by mixing two discrete input signals in the mixer of FIG. 5.
Figure 5:
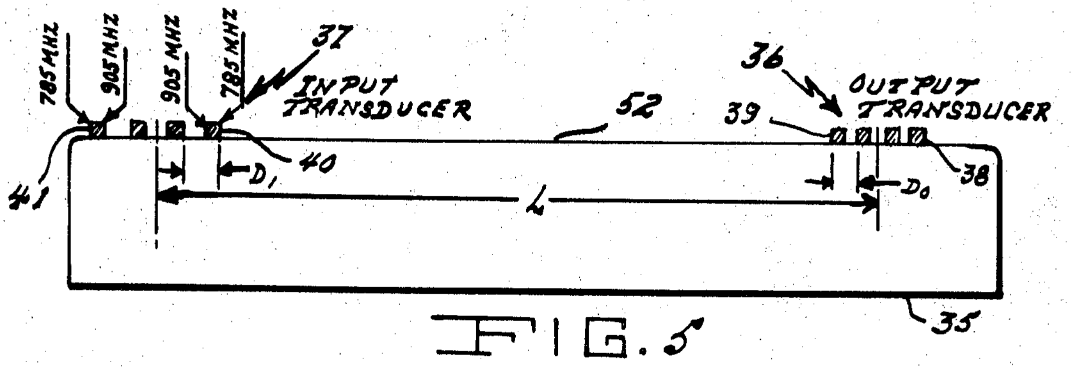
FIG. 5 illustrates a microwave acoustic surface wave mixer.

Referring now to FIG. 5, there is disclosed thereby a microwave acoustic surface wave mixer that is fabricated and operates in accordance with the principle of the invention. Substrate member 35 of piezoelectric material has input transducer 37 and output transducer 36 affixed by printed circuit means to its acoustic surface wave propagating surface 52. Input transducer 37 comprises interdigital fingers 40 and 41 which are spaced to be tuned to the operating frequency of the device. Input transducer 37 is also adapted to accept simultaneously two electromagnetic wave input signals of different frequencies. Output transducer 36 comprises interdigital fingers 38 and 39 that are spaced to be tuned with the sum or the difference signal depending upon the proposed use of the mixer. Output transducer 36 is positioned at a distance L from input transducer 37 determined by the peak of the power density acoustic surface wave curve of the sum or difference signal. Referring to FIG. 8, there is illustrated such a curve which represents the sum power density acoustic surface wave curve for electromagnetic input signals of 785 MHz. and 905 MHz. A mixer responsive to the sum of the inputs utilizing this curve would therefore have its input and output transducer spaced at approximately $L=4.0$ mm.

Figure 6:
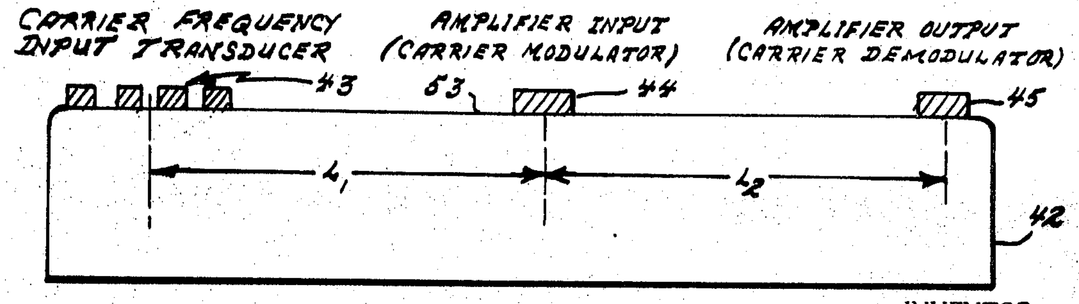
FIG. 6 illustrates a microwave acoustic surface wave amplifier.

A microwave acoustic surface wave amplifier embodying the concepts of the present invention is illustrated by FIG. 6. The amplifier comprises piezoelectric substrate member 42, electromagnetic wave to acoustic surface wave input transducer 43, modulating means 44 and demodulating means 45. Substrate number 42 has one polished surface 53 adapted to permit propagation of acoustic surface waves therealong. Input transducer 43 consists of interdigital fingers spaced to be in tune with the operating frequency of the device and affixed to surface 53 by printed or integrated circuit techniques. Modulating means 44 can be any suitable means for modulating acoustic surface waves such as gap interaction of carriers in a silicon film member placed in close proximity to surface 53. Demodulating means 45 likewise can be any suitable known means for demodulating acoustic surface waves. In order to practice the present invention with regard to such an amplifier, acoustic surface wave power density curves must be taken to determine the proper position of the input transducer, modulator and demodulator on the substrate member. In this regard it is only necessary to take the power density curve of the fundamental. Curve 17 of FIG. 2 is typical of such a curve. In order to achieve amplification the modulating means 44 is affixed to the substrate member 42 at a point coinciding with the first zero slope of the curve. This in the present example is approximately 5 mm. from the input transducer. An amplifier based on the curves of FIG. 2 therefore would have modulator and demodulator spacings of $L_1$=5 mm. and $L_2$=4 mm. It is apparent from an examination of FIG. 2 that amplifier gain is represented by the negative slope of the curve 17 between 5 mm. and 9 mm.

While the invention has been described in its preferred embodiments, it is understood that the words which have been used are words of description rather than words of limitation and that changes within the purview of the appended claims may be made without departing from the scope and spirit of the invention in its broader aspects.

What is claimed is:

1. An amplifier comprising a substrate member of piezoelectric material having a propagation surface adapted to permit the propagation of acoustic surface waves therealong, an electromagnetic wave to acoustic surface wave input transducer, disposed on said propagation surface, modulator means for modulating acoustic surface waves operably engaged to said propagation surface at a point substantially coinciding with the first power density minimum of an acoustic surface wave fundamental propagating from said input transducer, and demodulator means for demodulating acoustic surface waves operably engaged to said propagation surface at a point substantially coinciding with the first power density maximum of said surface wave fundamental beyond said modulator means.

2. An amplifier as defined in claim 1 wherein said input transducer comprises interdigital members spaced so as to be tuned to the amplifier operating frequency.

3. An amplifier as defined in claim 2 wherein said substrate member is lithium niobate.

4. The method of fabricating an amplifier comprising the steps of rendering one surface of a piezoelectric substrate member suitable for the propagation of acoustic surface waves, affixing an electromagnetic wave to acoustic surface wave input transducer to said surface, applying an electromagnetic wave input signal of a given frequency to said input transducer, measuring and recording the power densities of the acoustic surface wave fundamental responsive to said electromagnetic wave input signal propagating along said substrate member, affixing acoustic wave modulating means to said substrate member propagation surface at a point substantially coinciding with the first power density minimum of said acoustic surface wave fundamental, and affixing an acoustic wave demodulator to said substrate member propagation surface at a point substantially coinciding with the first power density maximum of said surface wave fundamental beyond said modulating means.